United States Patent [19]

Olsson

[11] Patent Number: 4,552,178

[45] Date of Patent: Nov. 12, 1985

[54] VARIABLE FLUID FLOW RESTRICTING THROTTLE

[75] Inventor: Aron Olsson, Mölndal, Sweden

[73] Assignee: Scanpump AB, Mölndal, Sweden

[21] Appl. No.: 460,966

[22] Filed: Jan. 25, 1983

[30] Foreign Application Priority Data

Apr. 7, 1982 [SE] Sweden .............................. 8202249

[51] Int. Cl.⁴ .............................................. F16K 11/07
[52] U.S. Cl. ............................ 137/625.46; 137/625.11;
137/271; 137/269; 251/206; 138/43
[58] Field of Search ..................... 138/42, 45, 855, 40,
138/43; 137/808, 810, 46, 625.46, 884, 625.47,
625.15, 625.16, 269, 271; 272/15; 251/125, 126,
127, 206

[56] References Cited

U.S. PATENT DOCUMENTS

| 2,980,032 | 4/1961 | Schneider | 137/855 |
| 3,323,550 | 6/1967 | Lee | 138/43 |
| 3,780,767 | 12/1973 | Borg et al. | 137/625.3 |
| 4,148,460 | 4/1970 | Kinsler | 251/206 |
| 4,410,001 | 10/1983 | Goguen | 137/625.46 |

FOREIGN PATENT DOCUMENTS 653627  5/1951  United Kingdom ................. 138/42

Primary Examiner—Martin P. Schwadron
Assistant Examiner—John S. Starsiak, Jr.
Attorney, Agent, or Firm—Dowell & Dowell

[57] ABSTRACT

A throttling device for restricting the flow of flushing fluid from a source of supply through a mechanical seal in which the throttle includes two members which are rotatably connected in fluid-tight relationship with respect to one another and which have a plurality of fluid flow openings there through which are symmetrically located about a common axis and which are selectively aligned to create varying fluid flow paths of varying diameters so that the flushing fluid is selectively channeled therethrough to an eddy current chamber within one of the members which serves to further restrict the flow of fluid with respect to the seal.

9 Claims, 4 Drawing Figures

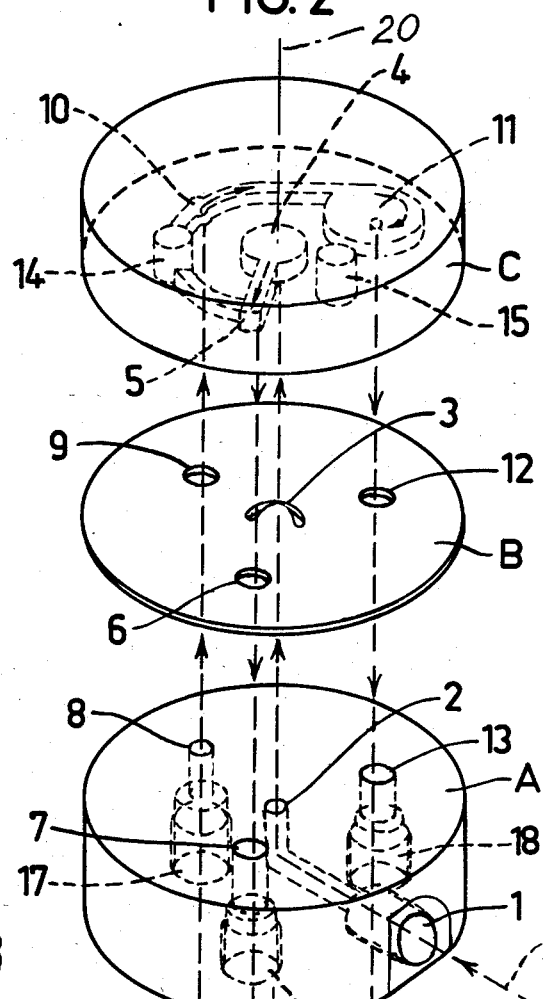
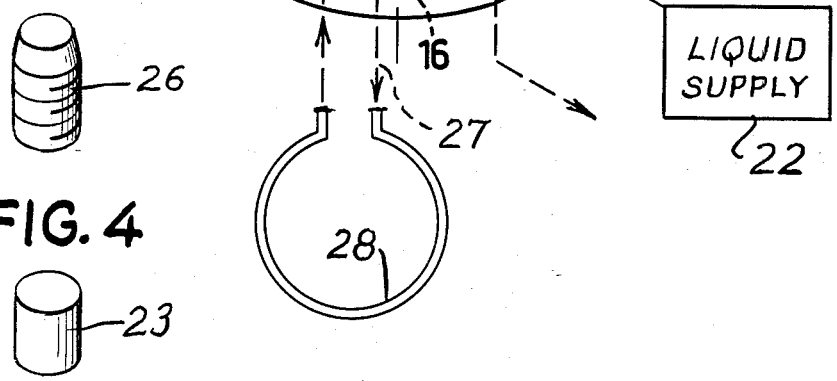
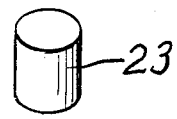

VARIABLE FLUID FLOW RESTRICTING THROTTLE

BACKGROUND OF THE INVENTION

The present invention is concerned with a throttle for restricting the flow of a flushing medium, in particularly a liquid, which is fitted between a supply of flushing fluid and at least one seal such as a stuffing box, mechanical seal, or similar device where the flushing fluid serves as a coolant/lubricant and/or as a sealing fluid. The throttle includes a throttling portion having an eddy current chamber provided therein.

Throttles of the type described with respect to this invention are principally used for seals for stuffing boxes or rotating shafts, as in pumps, agitators and similar apparatus, wherein the interior of the seal is usually under pressure. The flushing fluid supplied to the seal serves to lubricate the sliding surfaces thereof and to carry away frictional heat. The fluid also serves as the sealing fluid against the medium being pumped. It is preferred to keep the supply of flushing fluid to such seals as small as possible.

SUMMARY OF THE INVENTION

This invention is directed to a throttling device for restricting the flow of flushing fluid with respect to a mechanical seal wherein the throttle may be selectively utilized with either a single or double mechanical seal. The throttling device includes a base or connecting member to which a throttling member is rotatably secured in generally axial alignment therewith. Both the connecting and throttling members have a plurality of fluid openings therein which are generally symmetrically oriented with respect to the central axis of the throttling device and are selectively alignable so as to create various sizes of fluid flow paths through the throttling device. The throttling member also includes an eddy current chamber which is connected by way of a channel or fluid passageway with the fluid openings within the throttling member and through which the flushing fluid passes either toward the mechanical seal or toward a receiver after the fluid has passed through the seal in order that the flow of fluid is restricted with respect to the seal. In the one embodiment of the invention, removable plugs block non-selective fluid flow openings in the base member while in another embodiment, a plug carried within the throttling member may be selectively used to block the flow of fluid through the fluid flow passageway therein so as to create a flow path which passes from the throttle member through the mechanical seal and subsequently back through the eddy current chamber of the throttling member before the fluid is discharged.

It is a primary of the invention to provide a throttle of the above described type which can be fitted on pumps or similar equipment having either a single or double mechanical seal.

BRIEF DESCRIPTION OF THE DRAWINGS

FIG. 2 is an assembly view of the invention as it is used to supply flushing fluid to a double mechanical seal with the fluid flow path being shown by arrows.

FIG. 3 is a perspective view of the plug used in the embodiment of FIG. 2.

FIG. 4 is a perspective view showing the plugs used in the embodiment of FIG. 1.

DESCRIPTION OF THE PREFERRED EMBODIMENT

Figure 1:
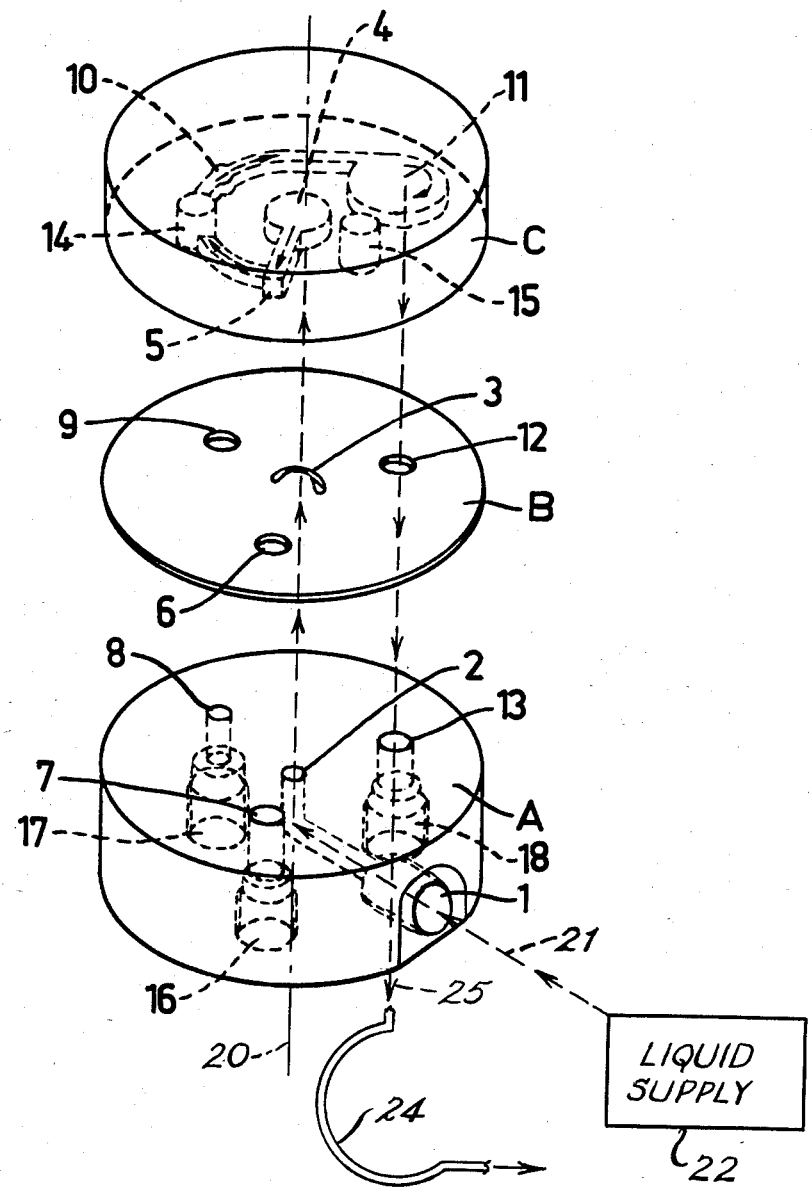
FIG. 1 is an assembly view of the invention as it is used to supply fluid to a single mechanical seal with the fluid flow path being shown by arrows.

The throttle illustrated in the drawings comprises a base or connecting part A, which may be made of metal, a gasket part B, made of rubber or plastic, and a throttling member C, preferrably made of a plastic material. In use, these three parts are united such as by being screwed together by means not shown in the drawings.

In the embodiment illustrated, all the parts are circular bodies with a common central axis 20. The parts may be shaped differently, but it is essential to the invention that they are rotatable about a common axis and that the fluid connections between the parts are symmetrically arranged about such axis.

The connecting part A comprises a screw-threaded opening 1 designed to receive the connection fitting of a line 21 for the supply of flushing fluid to the throttle. The opening or duct 1, which runs substantially horizontally in the figure, is connected to a vertical duct or inlet channel 2 which is concentric with the common central axis of rotation 20 of the parts and which discharges at the upper face of the connecting part A as shown in the drawings. The connecting part A is further provided with three ducts or channels 7, 8 and 13 arranged symmetrically about the central axis, which channels like-wise are open at the upper face of the connecting part A and extend through the connecting part to the lower face thereof at which point screw-threaded openings 16, 17, and 18 are provided for the connection of fluid lines as more particularly described hereafter. The three through channels 7, 8 and 13 are located at the same radial distance from the axis of the connecting part A, with an angular spacing of e.g. 120°.

The gasket part B preferably is formed of a gasket of rubber or plastic and is provided with three through holes 6, 9 and 12, which are located at the same radial distance from the common axis of the connecting part and the gasket part as the channels 7, 8 and 13. The through holes communicate with the channels when the throttle is assembled. Hence the through holes 6, 9 and 12 are also arranged at an angular distance of 120°. The gasket part B includes a flap portion 3 at the centre thereof which is aligned with the axis of the throttle and hence also with channel 2 in the connecting part A. The flap covers the mouth of channel 2 and serves as a non-return valve.

The throttling part C includes an inlet in the shape of a chamber or opening 4 which is located at the centre thereof so as to be concentric with the axis of the throttle, and which is of a size to permit the flap 3 of the gasket part B to open therein to thereby clear the mouth of channel 2 in the connecting part A. A fluid passageway extends from chamber or opening 4 to a chamber 5 which, when the throttle is assembled, is located above hole 6 in the gasket part B and channel 7 in the connecting part A. The chamber 5 communicates via the fluid passageway with a blocking chamber 14, whose function is described below, and from chamber 14 the fluid passageway extends to the eddy chamber 11, wherein the flow of flushing fluid is throttled by the eddy principle. The eddy chamber 11 is located above hole 12 in the gasket part B and above channel 13 in the connecting part A. The throttling part C is further provided with a storage chamber 15 of substantially the same shape as blocking chamber 14 and serving as a storage chamber for a plug 23 (FIG. 3) used to plug chamber 14 as more particularly described below.

The respective parts A, B and C of the throttle are primarily intended to be assembled in the mutual rotational arrangement shown in FIGS. 1 and 2. FIG. 1 shows the operation of the throttle in connection with a single mechanical seal which is shown symbolically and designated 24 in the Figure, where the throttle functions as follows: Flushing fluid is conducted from a flushing fluid line connected to the screw-threaded opening 1 into channel 2 in the connecting part A, displaces the flap 3, serving as a non-return valve, of the gasket part B, and enters opening 4 in the throttling part C. On leaving chamber 4 the flushing fluid passes through chamber 5 and blocking chamber 14 to the eddy chamber 11, where the flow is throttled by the eddy principle. From the centre of the eddy chamber 11, which is concentric with hole 12 in the gasket part B and channel 13 in the connecting part A, the flushing fluid passes to the screw-threaded connection 18, from where it is conducted through conduit 25 to the sealing clearance of the mechanical seal. Alternatively, the throttle may be located after the seal, the fluid being conducted from the sealing clearance of the mechanical seal to the connection 1, through the throttle in the manner described above, and from the outlet 18 to waste or to a receiver. In both the arrangements described the screw-threaded connections 16 and 17 to the ducts or channels 7, 8 are plugged with screw-threaded plugs 26 (FIG. 4).

The operation of the throttle in combination with a double mechanical seal is shown in FIG. 2 and is as follows: The flushing fluid is introduced as before through conduit 25 via the screw-threaded connection 1 and passes through channel 2, via the non-return valve flap 3 in the gasket part B, into opening 4. From opening 4 the fluid flows to chamber 5 and, since blocking chamber 14 is, in this case, stoppered with the plug 23 which is otherwise kept in storage chamber 15, the fluid will flow from chamber 5 down to hole 6 in the gasket part B and into duct or channel 7 in the connecting part A. Connected to the screw-threaded discharge 16 of channel 7 is a pipeline or conduit 27 from which the fluid is conducted into the double mechanical seal 28 indicated schematically at the bottom of FIG. 2. On leaving the double seal the fluid is conducted back via a pipeline screwed into the threaded connection 17 of channel 8 in the connecting part A, from where it passes via hole 9 in the gasket part B into an opening or chamber 10, located above the hole 9, in the fluid passageway between chamber 14 and the eddy chamber 11. On leaving the eddy chamber 11, the fluid is conducted via hole 12 in the gasket part B to channel 13 in the connecting part A, via the screw-threaded connection 18 to waste or to a receiver.

The symmetrically arranged channels 7, 8 and 13 in the connecting part A may, as shown in the example illustrated, differ in diameter. By arranging the connecting part A in different rotational positions with respect to the throttling part C, thus bringing channels of different sizes under the eddy chamber 11, the volumetric flow through the throttle or flow restrictor can be given three different values for a given pressure drop.

The flap 3 in the centre of the gasket or packing part B prevents reverse flow of the fluid in the event of failure of the fluid supply or if the flushing fluid pressure is insufficient to cover the discharge of inlet channel 2.

It is apparent from the above that the throttle according to the invention is very compactly designed. Because of an ingenious arrangement of the channels and the connecting openings, the device can be used with both single and double sealing arrangements without the need to modify any of the main components. Moreover, a non-return valve is combined with the sealing function. Because of its small size, the device is easily arranged as a freely mounted component of a piping system, unlike previously known throttles, which are assembled of a number of components which together require special arrangements in order to be applied to a pump or similar equipment.

It will be evident that the embodiment illustrated is only one example of the invention and that modifications may be made within the framework of the following claims.

I claim:

1. A throttle for restricting the flow of a liquid to be applied from a source of supply to at least one seal or rotary shaft, comprising a connecting member having an inlet connection for receiving the fluid from the source and at least one outlet connection for discharging the fluid to the seal, an inlet channel extending from said inlet connection through said connecting member, a throttling member having an inlet opening and a vortex chamber spaced from said inlet opening therein, said inlet opening of said throttling member being in communication with said inlet channel of said connecting member so as to receive fluid passing therethrough, a fluid passageway connecting said inlet opening in said throttling member with said vortex chamber, said fluid passageway opening substantially tangentially into said vortex chamber, said throttling member being rotatably mounted about a common central axis to said connecting member and being secured substantially in liquid tight engagement thereto, and a return channel within said connecting member extending substantially coaxially with respect to said vortex chamber and connecting said vortex chamber in fluid communication with said outlet connection of said connecting member.

2. The throttle of claim 1 in which at least a portion of said inlet channel extends along said central axis into communication with said inlet opening of said throttling member which inlet opening is also located along said central axis, and said vortex chamber being disposed a radial distance from said central axis.

3. The throttle of claim 2 in which the connecting member includes first and second auxiliary channel means extending from adjacent said throttling member and through said connecting member in generally parallel relationship to said common central axis.

4. The throttle according to claim 3 in which said first and second auxiliary channels are located at the same distance from said central axis as is said return channel, said first and second auxiliary channels being selectively aligned substantially coaxially with respect to said vortex chamber.

5. The throttle of claim 3 in which said return channel and said first and second auxiliary channels have different cross-sectional areas so that the volumetric flow capacity therethrough will vary depending upon their respective cross-sectional areas.

6. The throttle of claim 5 in which each of said return channel and said first and second auxiliary channels includes an opening portion in said connecting member, removable plug means receivable within said opening portions for selectively sealing and preventing fluid passing through any two of said first and second auxiliary channels and said return channel.

7. The throttle of claim 3 wherein said fluid passageway connecting said inlet of said throttling member to said vortex chamber includes an arcuate portion, said first and second auxiliary channels communicating with said fluid passageway at first and second spaced locations which are the same radial distance from said common central axis with respect to one another and which are between said inlet opening into said throttling member and said vortex chamber, a fluid blocking chamber positioned along said fluid passageway between said first and second locations, and plug means removable mounted within said blocking chamber for blocking the flow of fluid through said fluid passageway so as to direct the fluid flow from said inlet opening through said first auxiliary channel to the seal and thereafter through said second auxiliary channel and said fluid passageway to said vortex chamber and to said return channel.

8. The throttle according to claim 7 including a storage chamber in said throttling member at a point remote from said blocking chamber and said fluid passageway, said plug means being selectively retained within said storage chamber when not in use within said blocking chamber.

9. The throttle of claim 1 including a gasket member seated between said connecting member and said throttling member, said gasket member having a passage generally centrally thereof for communicating said inlet channel of said connecting member with said inlet opening of said throttling member and a nonreturn flap valve positioned within said passage and being selectively closeable against said connecting member for preventing the reverse flow of fluid into said connecting member.

* * * * *